US008376273B2

(12) United States Patent
Thompson

(10) Patent No.: US 8,376,273 B2
(45) Date of Patent: Feb. 19, 2013

(54) AIRCRAFT BRAKING SYSTEM

(75) Inventor: Robert Ian Thompson, Gloucestershire (GB)

(73) Assignee: Airbus Operations Limited, Bristol (GB)

( * ) Notice: Subject to any disclaimer, the term of this patent is extended or adjusted under 35 U.S.C. 154(b) by 1106 days.

(21) Appl. No.: 12/091,494

(22) PCT Filed: Nov. 10, 2006

(86) PCT No.: PCT/GB2006/004206
§ 371 (c)(1),
(2), (4) Date: Apr. 25, 2008

(87) PCT Pub. No.: WO2007/054715
PCT Pub. Date: May 18, 2007

(65) Prior Publication Data
US 2008/0283660 A1    Nov. 20, 2008

(30) Foreign Application Priority Data
Nov. 11, 2005  (GB) .................................. 0523069.3

(51) Int. Cl.
*B64F 1/02*    (2006.01)
(52) U.S. Cl. ................. 244/110 A; 244/111; 244/103 R
(58) Field of Classification Search ................. 244/111, 244/103, 110 R, 110 A
See application file for complete search history.

(56) References Cited

U.S. PATENT DOCUMENTS

| 1,573,100 A | 2/1926 | Sperry |
| 1,622,145 A | 3/1927 | Hunt |
| 1,931,282 A | 10/1933 | Boykow |
| 2,128,044 A | 8/1938 | Grabner |
| 2,149,634 A | 3/1939 | Schweitzer, Jr. |
| 2,355,026 A | 8/1944 | Koppen |
| 2,475,461 A | 7/1949 | Roberts |
| 2,564,320 A | 8/1951 | Brainard |

(Continued)

FOREIGN PATENT DOCUMENTS

| DE | 1273335 | 7/1968 |
| EP | 0611675 | 8/1994 |

(Continued)

OTHER PUBLICATIONS

ISR for PCT/GB2006/004206 dated Mar. 9, 2007.

(Continued)

*Primary Examiner* — Benjamin P Lee
(74) *Attorney, Agent, or Firm* — Lowe Hauptman Ham & Berner, LLP

(57) ABSTRACT

A method of braked pivot turning an aircraft, the aircraft comprising a fuselage and a landing gear assembly located to one side thereof. The landing gear comprises a bogie with wheels mounted thereon, at least one wheel being located on a first side of the bogie and at least one wheel being located on a second side of the bogie. The method includes the steps of applying thrust (7") for moving or turning the aircraft, and via the braking of at least one wheel, applying a greater braking force to the first side of the bogie than to the second side. The first side is located closer to the center of turning of the aircraft than the second side. The method thereby generates relatively low torque loads in the landing gear leg, reducing fatigue damage. A brake control system is also provided for selectively braking wheels during a turn.

15 Claims, 4 Drawing Sheets

U.S. PATENT DOCUMENTS

| | | | |
|---|---|---|---|
| 2,767,368 A | | 10/1956 | Kober |
| 2,794,609 A | * | 6/1957 | Perry .......................... 244/111 |
| 2,891,742 A | | 6/1959 | Treffeisen et al. |
| 2,911,168 A | * | 11/1959 | Moreland .................... 244/50 |
| 2,914,359 A | | 11/1959 | Yarber |
| 2,998,538 A | | 8/1961 | O'Mahony |
| 3,017,145 A | | 1/1962 | Yarber |
| 3,292,021 A | | 12/1966 | Hoag |
| 3,310,976 A | | 3/1967 | Bussell et al. |
| 3,344,325 A | | 9/1967 | Sklaroff |
| 3,396,325 A | | 8/1968 | Hopkins |
| 3,466,518 A | | 9/1969 | Aylikci et al. |
| 3,482,806 A | | 12/1969 | Trautzsch et al. |
| 3,622,977 A | | 11/1971 | Wakamatsu et al. |
| 3,671,788 A | | 6/1972 | Knudson et al. |
| 4,001,617 A | | 1/1977 | Boyer |
| 4,008,868 A | * | 2/1977 | Berg .......................... 244/111 |
| 4,223,255 A | | 9/1980 | Goldman et al. |
| 4,402,478 A | * | 9/1983 | Martin ........................ 244/111 |
| 4,482,961 A | * | 11/1984 | Kilner et al. .................... 701/16 |
| 4,488,053 A | | 12/1984 | Cronin |
| 4,499,420 A | | 2/1985 | Shiraki et al. |
| 4,562,399 A | | 12/1985 | Fisher |
| 4,564,778 A | | 1/1986 | Yoshida |
| 4,567,391 A | | 1/1986 | Tucker et al. |
| 4,572,585 A | | 2/1986 | Guichard |
| 4,585,085 A | | 4/1986 | Handel et al. |
| 4,642,539 A | | 2/1987 | Hinds |
| 4,659,040 A | | 4/1987 | Sinclair |
| 4,687,158 A | | 8/1987 | Kettering |
| 4,885,526 A | | 12/1989 | Szabo |
| 4,923,056 A | * | 5/1990 | Nedelk ....................... 188/71.1 |
| 5,097,140 A | | 3/1992 | Crall |
| 5,175,462 A | | 12/1992 | Yoshino et al. |
| 5,182,958 A | | 2/1993 | Black |
| 5,207,304 A | | 5/1993 | Lechner et al. |
| 5,397,975 A | | 3/1995 | Syverson |
| 5,632,534 A | | 5/1997 | Knechtges |
| 5,669,470 A | | 9/1997 | Ross |
| 5,704,568 A | * | 1/1998 | Watts ............................ 244/50 |
| 5,721,473 A | | 2/1998 | DeVries |
| 5,833,564 A | | 11/1998 | Harris |
| 5,845,975 A | * | 12/1998 | Wells .......................... 303/126 |
| 5,944,147 A | | 8/1999 | Berwanger |
| 5,998,307 A | | 12/1999 | Lam et al. |
| 6,046,518 A | | 4/2000 | Williams |
| 6,064,135 A | | 5/2000 | Hahn |
| 6,137,250 A | | 10/2000 | Hirano et al. |
| 6,140,780 A | | 10/2000 | Oshima et al. |
| 6,149,100 A | * | 11/2000 | Ralph ....................... 244/103 R |
| 6,177,773 B1 | | 1/2001 | Nakano et al. |
| 6,220,676 B1 | | 4/2001 | Rudd, III |
| 6,223,106 B1 | | 4/2001 | Yano et al. |
| 6,257,681 B1 | | 7/2001 | Bartram |
| 6,295,487 B1 | | 9/2001 | Ono et al. |
| 6,297,575 B1 | | 10/2001 | Yang |
| 6,318,487 B2 | | 11/2001 | Yanase et al. |
| 6,323,573 B1 | | 11/2001 | Pinkerton |
| 6,362,750 B1 | | 3/2002 | Castor |
| 6,398,162 B1 | * | 6/2002 | Stimson et al. ............... 244/111 |
| 6,402,259 B2 | | 6/2002 | Corio et al. |
| 6,450,448 B1 | | 9/2002 | Suzuki |
| 6,478,252 B1 | | 11/2002 | Stimson et al. |
| 6,484,072 B1 | | 11/2002 | Anderson et al. |
| 6,573,675 B2 | | 6/2003 | Schmitz et al. |
| 6,590,312 B1 | | 7/2003 | Seguchi et al. |
| 6,604,708 B1 | | 8/2003 | DeVlieg |
| 6,617,748 B2 | | 9/2003 | Dunn |
| 6,633,106 B1 | | 10/2003 | Swett |
| 6,752,353 B2 | | 6/2004 | Park |
| 6,758,440 B1 | | 7/2004 | Repp et al. |
| 6,820,946 B2 | * | 11/2004 | Salamat et al. ........... 303/122.09 |
| 6,851,649 B1 | * | 2/2005 | Radford ........................ 244/111 |
| 6,918,470 B2 | | 7/2005 | Guaraldo |
| 7,226,018 B2 | * | 6/2007 | Sullivan ....................... 244/111 |
| 7,237,748 B2 | | 7/2007 | Sullivan |
| 7,262,536 B2 | | 8/2007 | Rahman et al. |
| 7,281,684 B2 | * | 10/2007 | Steiner et al. ................. 244/111 |
| 7,300,020 B2 | * | 11/2007 | Steiner et al. ................. 244/111 |
| 7,306,065 B2 | | 12/2007 | Nagaya |
| 7,789,469 B2 | * | 9/2010 | DeVlieg et al. .................... 303/3 |
| 7,967,247 B2 | * | 6/2011 | Bellouard et al. ............. 244/111 |
| 8,016,366 B2 | * | 9/2011 | Rudd, III ....................... 303/147 |
| 2001/0029414 A1 | | 10/2001 | Nada |
| 2002/0007975 A1 | | 1/2002 | Naito et al. |
| 2002/0113440 A1 | | 8/2002 | Kimura et al. |
| 2002/0171324 A1 | | 11/2002 | Smith et al. |
| 2003/0057663 A1 | | 3/2003 | Trescott |
| 2003/0062206 A1 | | 4/2003 | Fujikawa |
| 2003/0116367 A1 | | 6/2003 | Kanno |
| 2003/0125848 A1 | | 7/2003 | Otake et al. |
| 2003/0158638 A1 | | 8/2003 | Yakes et al. |
| 2003/0159866 A1 | | 8/2003 | Claypole et al. |
| 2003/0183430 A1 | | 10/2003 | Naito et al. |
| 2003/0189380 A1 | | 10/2003 | Ishikawa et al. |
| 2004/0040756 A1 | | 3/2004 | Nmngani |
| 2004/0065776 A1 | * | 4/2004 | DeVlieg ........................ 244/111 |
| 2004/0124796 A1 | | 7/2004 | Bailey et al. |
| 2004/0154880 A1 | | 8/2004 | Guaraldo |
| 2004/0155468 A1 | | 8/2004 | Yang |
| 2004/0159480 A1 | | 8/2004 | Ishikawa et al. |
| 2004/0212259 A1 | | 10/2004 | Gould |
| 2004/0263099 A1 | | 12/2004 | Maslov et al. |
| 2005/0073213 A1 | | 4/2005 | Naito et al. |
| 2005/0082424 A1 | | 4/2005 | Yamamoto |
| 2005/0109568 A1 | | 5/2005 | Ether |
| 2005/0178115 A1 | | 8/2005 | Hughey |
| 2005/0181246 A1 | | 8/2005 | Nakaji |
| 2005/0189894 A1 | | 9/2005 | Komiyama et al. |
| 2005/0231031 A1 | | 10/2005 | Bellouard et al. |
| 2005/0258790 A1 | | 11/2005 | Takeuchi |
| 2006/0028178 A1 | | 2/2006 | Hobbs |
| 2006/0186267 A1 | * | 8/2006 | Steiner et al. ............. 244/110 A |
| 2007/0252036 A1 | * | 11/2007 | Steiner et al. ................. 244/111 |
| 2008/0179146 A1 | | 7/2008 | Sullivan |
| 2009/0069958 A1 | * | 3/2009 | Regis et al. ....................... 701/3 |
| 2009/0261197 A1 | * | 10/2009 | Cox et al. ........................ 244/50 |
| 2010/0006699 A1 | | 1/2010 | Sullivan |
| 2010/0276988 A1 | * | 11/2010 | Cahill ............................ 303/20 |

FOREIGN PATENT DOCUMENTS

| | | |
|---|---|---|
| EP | 0875430 | 4/1998 |
| EP | 0921621 | 6/1999 |
| GB | 481946 | 3/1938 |
| GB | 711832 | 7/1954 |
| GB | 902155 | 7/1962 |
| GB | 1213862 | 11/1970 |
| JP | S62-265023 | 11/1987 |
| JP | H03-295796 | 12/1991 |
| JP | H08-289501 | 11/1996 |
| JP | H09-182329 | 7/1997 |
| JP | 2003-182399 | 7/2003 |
| RU | 2023630 | 11/1994 |
| RU | 2213408 | 9/2003 |
| WO | 96/09679 | 3/1996 |
| WO | 96/38903 | 12/1996 |
| WO | 00/76054 | 12/2000 |
| WO | 03/047070 | 6/2003 |
| WO | 03/085806 | 10/2003 |
| WO | WO 2006134257 A1 * | 12/2006 |

OTHER PUBLICATIONS

GB Search Report for GB0523069.3 dated Feb. 10, 2006.
http://en.wikipedia.org/wiki/Undercarriage, "Undercarriage", pp. 1-2.
www.wisegeek.com, "What is Carbon Nanofoam" pp. 1-2.
www.wikipedia.org, "Electromagnet", pp. 1-3.
www.wikipedia.org, "Regenerative Brake", pp. 1-2.
www.electrochem.cwru.ed "Electrochemistry Encyclopedia—Electrical Uses of Carbon", pp. 1-11.
www.wikipedia.org, "Ferromagnetism", pp. 1-4.

* cited by examiner

AIRCRAFT BRAKING SYSTEM

RELATED APPLICATIONS

The present application is based on International Application Number PCT/GB2006/004206 filed Nov. 10, 2006, and claims priority from British Application Number 0523069.3 filed Nov. 11, 2005, the disclosures of which are hereby incorporated by reference herein in their entirety.

TECHNICAL FIELD

The present invention relates to aircraft and in particular to a method of maneuvering an aircraft on the ground.

BACKGROUND TO THE INVENTION

It is desirable for aircraft, and particularly large aircraft, to be able to manoeuvre on the ground within a tight turning circle. To turn an aircraft in a tight turning circle it is known to typically perform a 'braked pivot turn'. The braked pivot turn is typically effected by turning the aircraft nose wheel, applying differential engine thrust and applying the brakes to all the wheels of one of the landing gear, broadly speaking around which, the aircraft turns.

Such a manoeuvre generates significant torsion loads in the landing gear that is on the inside of the turn due to the scrubbing of the wheel tyres on the ground, and on many aircraft the torsion loads are sufficiently large to cause fatigue damage to the landing gear structure. Aircraft to which significant fatigue damage may occur may be banned from making the above-described pivot turn manoeuvre, and are therefore limited in their on-ground maneuverability.

SUMMARY OF THE INVENTION

The present invention seeks to provide a method of braked pivot turning an aircraft which generates lower torsion loads in the landing gear structure and/or mitigates at least some of the above-mentioned problems.

The present invention provides a method of braked pivot turning an aircraft on the ground, the aircraft comprising a fuselage and a landing gear assembly located to one side thereof, the landing gear assembly comprising a bogie with a plurality of wheels mounted thereon, at least one wheel being located on a first side of the bogie and at least one wheel being located on a second side of the bogie, the method including the steps of:
(i) applying thrust suitable for moving the aircraft, and
(ii) via the braking of at least one wheel, applying a greater braking force to the first side of the bogie than to the second side, the first side being located closer to the centre of turning of the aircraft than the second side.

A braked pivot turn in accordance with embodiments of the present invention may generate lower torsion loads in the landing gear than one in which all wheels on the landing gear are braked. It is thought that during a pivot turn according to embodiments of the present invention a primary torque is generated in the landing gear assembly by the turning motion of the aircraft and the scrubbing of the tyres on the ground. In addition however, it is thought that a secondary torque is generated in the landing gear assembly due to the differential braking force applied to either side of the bogie. By applying a greater braking force to the first side of the bogie of the landing gear assembly than to the second side in accordance with embodiments of the invention, the secondary torque is generated in the opposite direction to the primary torque. The net torque to which the landing gear is subjected is thereby reduced.

It shall be understood that the aircraft is usually symmetrical about its centre line and thus usually includes at least two landing gear assemblies, each located to one respective side of the fuselage. The aircraft may include more than two landing gear assemblies.

It will also be understood that the steps recited in accordance with method(s) of the present invention need not be performed in the order shown and may, in fact, be performed in any order.

The landing gear assembly may comprise a leg and the secondary torque in the leg may be in the opposite direction to the primary torque, the net torque in the leg thereby being reduced. The leg may be connected at a location offset from the first side of the bogie. The leg may be connected to the bogie at a location between the first and second sides. The location may be mid-way between the first and second sides.

The landing gear may be to one side of the fuselage, but at a spanwise location inside the widest point of the fuselage, but preferably the landing gear is located at a spanwise location outside the widest point on the fuselage.

The thrust may be a differential thrust suitable for turning the aircraft. It will be understood that the differential thrust may include a forward thrust (i.e. a thrust that urges the aircraft to move forward) on one side of the aircraft. The differential thrust may include a reverse thrust on one side of the aircraft. The differential thrust may be a combination of forward and reverse thrust. The differential thrust may comprise a net forward thrust. The thrust is preferably generated by at least one engine on the aircraft. The net thrust may act through a centre of thrust spaced apart from the centre line of the fuselage. The spanwise spacing of the centre of thrust from the centre-line of the fuselage may be greater than the spanwise spacing of the landing gear from the centre-line of the fuselage. The net thrust may, of course, act very close to, or substantially along, the centre line of the fuselage. This may occur, for example, on an aircraft having a rear fuselage nacelle (RFN) configuration.

Usually the net thrust is a forward thrust, and the centre of turning is located outside the landing gear assembly (i.e. the spanwise spacing of the centre of turning from the centre line of the fuselage, is greater than the spanwise spacing of the landing gear assembly from the centre line of the fuselage).

A greater braking force may be applied to one or more wheels on the first side of the bogie than the second side of the bogie. Usually, all wheels on the first side of the bogie are fully braked and all wheels on the second side of the bogie are free to rotate. Alternatively or additionally brakes may be applied to fewer wheels on the second side of the bogie than the first side of the bogie. At least one more wheel may be braked on the first side of the bogie than on the second side.

The aircraft may be travelling at low speed during the manoeuvre. Preferably the aircraft is travelling at less than 40 knts. More preferably the aircraft is travelling at less than 20 knts. The aircraft may be travelling at less than 10 knts. As the aircraft tends to rotate about a given point, the speed at different points on the aircraft varies in dependence on their distance from the centre of turning. It will be understood that reference herein to the speed of the aircraft during the manoeuvre, refers to the speed of a point in the fore of the aircraft and more preferably to the speed of a point along the centre line of the aircraft which lies on a landing gear supporting a nose wheel on the aircraft.

The aircraft may further comprise a nose wheel. It will be understood that turning the nose wheel at an angle to the centre line of the fuselage, may improve the turning circle of the aircraft and/or reduce stresses in the aircraft landing gear and particularly the nose landing gear. The aircraft may of course, comprise a plurality of nose wheels, and references to the nose wheel shall be interpreted accordingly. The method according to embodiments of the present invention may further include the step of turning the nose wheel at an angle to the centre-line of the aircraft fuselage. The angle is preferably greater than 30 degrees. More preferably the angle is greater than 45 degrees. More preferably the angle is greater than 60 degrees.

It will be understood by the person skilled in the art that the nose wheel may be turned either towards or away from the direction of aircraft turning. Typically the nose wheel would be turned in the direction of the aircraft turn, such that the wheel is driven forward during the pivot turn manoeuvre.

The method may further comprise the steps of:
(i) receiving a signal relating to an aircraft parameter, and
(ii) applying the braking force in dependence on the signal.

The method may comprise the step of receiving a plurality of signals relating to a plurality of aircraft parameters. The aircraft parameter or one of the aircraft parameters may be the speed of the aircraft. The aircraft parameter or one of the aircraft parameters may be the angle of the nose wheel to the centre line of the aircraft fuselage. The aircraft parameter or one of the aircraft parameters may be any one or more of the following: the thrust of an aircraft engine, the location and/or magnitude of the net thrust, the location of the centre of turning, data that allows the location of the centre of turning to be determined.

The method may further comprise the steps of:
(i) comparing the value of the aircraft parameter to an aircraft parameter reference threshold, and
(ii) applying the braking force (in a differential manner as described above) if the value of the parameter is outside the reference threshold.

Accordingly, embodiments of the present invention may be arranged to apply a greater braking force to the first side of the bogie of the landing gear assembly than to the second side, under only certain conditions. For example, a greater braking force may be applied to the first side of the bogie of the landing gear assembly than to the second side when the angle of the nose wheel to the centre line of the fuselage is greater than a threshold. The threshold may be predetermined.

The method may include the step of apportioning the braking force to either side of the bogie. The step of apportioning the braking force may be fully automated.

The method may include the step of receiving a signal relating to the application of brakes to the wheels of the aircraft landing gear (for example when the pilot applies the landing gear brakes) and applying the braking force according to the invention in dependence on this signal. Embodiments of the present invention may thereby provide a method which selectively controls the braking of wheels on an aircraft landing gear during an aircraft braked pivot turn, with a relatively low input from the aircraft pilot.

Embodiments of the present invention may also provide a brake control system for performing at least one step of the method described herein. Preferably the brake control system is arranged to brake at least one wheel on the landing gear assembly in accordance with the invention. The brake control system may be arranged to brake at least one wheel on the landing gear assembly in accordance with the invention in dependence on a signal, or more preferably a plurality of signals. For example, the brake control system may be arranged to brake at least one wheel on the landing gear when the speed of the aircraft is below a threshold value and the angle of the nose wheel is above a threshold value, the threshold values being determined by a signal or signals, received by the brake control system.

According to another aspect of the present invention there is provided a brake control system for selectively braking wheels on a landing gear assembly during an aircraft braked pivot turn, the aircraft comprising a fuselage and the landing gear assembly being located to one side thereof, the landing gear assembly comprising a bogie with a plurality of wheels mounted thereon, at least one wheel being located on a first side of the bogie and at least one wheel being located on a second side of the bogie,
wherein the brake control system is arranged to effect, via the braking of at least one wheel, a greater braking force on the first side of the bogie than on the second side, the first side being located closer to the centre of turning of the aircraft than the second side.

The brake control system may comprise a brake input receiver for receiving a signal relating to the application of brakes to the wheels of the aircraft landing gear, wherein the brake control system is arranged to effect the braking force in dependence on the signal received by the brake input receiver. The brake input receiver may receive the signal when the pilot applies the landing gear brakes. Embodiments of the present invention may thereby provide a brake control system which selectively controls the braking of wheels on an aircraft landing gear during an aircraft braked pivot turn, with a relatively low input from the aircraft pilot.

The brake control system preferably further comprises a first receiver for receiving a signal relating to an aircraft parameter. The brake control system may comprise a plurality of receivers for receiving a signal or signals relating to a plurality of aircraft parameters. An aircraft parameter may, for example, be the speed of the aircraft. An aircraft parameter may be the angle of the nose wheel to the centre line of the aircraft fuselage.

The brake control system may be arranged to effect, via the braking of at least one wheel, and in dependence on the signal or signals received by at least one receiver, and more preferably in further dependence on the signal received by the brake input receiver, a greater braking force on the first side of a bogie of the landing gear assembly than on the second side.

The brake control system may further comprise a database for storing an aircraft parameter reference threshold. The brake control system may be arranged to compare the value of the aircraft parameter to the aircraft parameter reference threshold, and may be arranged to effect the braking of at least one wheel in dependence on the comparison of the aircraft parameter to the aircraft parameter reference threshold.

Embodiments of the present invention may therefore provide a method and a brake control system which selectively controls the braking of wheels on an aircraft landing gear during a braked pivot turn, with a relatively low input from the aircraft pilot. The method and brake control system may selectively control the braking of wheels on an aircraft landing gear during a braked pivot turn if the aircraft parameter(s) are outside certain thresholds. For example if the aircraft pilot attempts to manoeuvre the aircraft on the ground with the nose wheel at an angle of 70 degrees and with all wheels on a landing gear assembly (preferably the landing gear assembly on the inside of the turn) braked, the brake control system may selectively control the braking of wheels on an aircraft landing gear in accordance with the invention, such that the secondary torque is in the opposite direction to the primary torque.

According to another aspect of the present invention there is provided an aircraft for use in the method of the invention as described herein, wherein the aircraft is so arranged that a greater braking force can be applied to the first side of the bogie of the landing gear assembly than to the second side.

According to another aspect of the present invention there is provided an aircraft including a brake control system as described herein.

According to yet another aspect of the present invention there is further provided a method of braked pivot turning an aircraft on the ground, the aircraft comprising a fuselage, two landing gear assemblies, the landing gear assemblies being located either side of the fuselage and each comprising a bogie with a plurality of wheels mounted thereon, at least one wheel being located on an inner side of the bogie and at least one wheel being located on an outer side of the bogie,
the method including the steps of:
(i) applying thrust suitable for moving the aircraft, and
(ii) braking at least one wheel on the landing gear assembly that is located the closer to the centre of turning of the aircraft,
wherein,
via the braking of at least one wheel, a greater braking force is applied to the outer side of the bogie of said landing gear assembly than to the inner side. It will be understood that the inner side of the bogie is located, when the aircraft is on the ground, closer to the fuselage than the outer side. It will also be understood that embodiments of such a method may be of particular advantage when the centre of turning is located outside the landing gear assembly.

The present invention is of greater application to larger aircraft. The aircraft is preferably heavier than 50 tonnes dry weight, and more preferably heavier than 200 tonnes dry weight. The aircraft is preferably of a size equivalent to an aircraft designed to carry more than 75 passengers, and more preferably more than 200 passengers.

Embodiments of the present invention may equally apply to other types of tight turns, such as a Jacobs manoeuvre.

It will be understood that aspects of the invention described with reference to the methods of the invention may equally be applied to any of the above-described apparatus of the invention, such as the aircraft and the brake control system, or to any of the other methods of the invention, and vice versa.

DESCRIPTION OF THE DRAWINGS

Various embodiments of the invention will now be described, by way of example only, with reference to the accompanying schematic drawings of which.

DETAILED DESCRIPTION

Figure 1A:
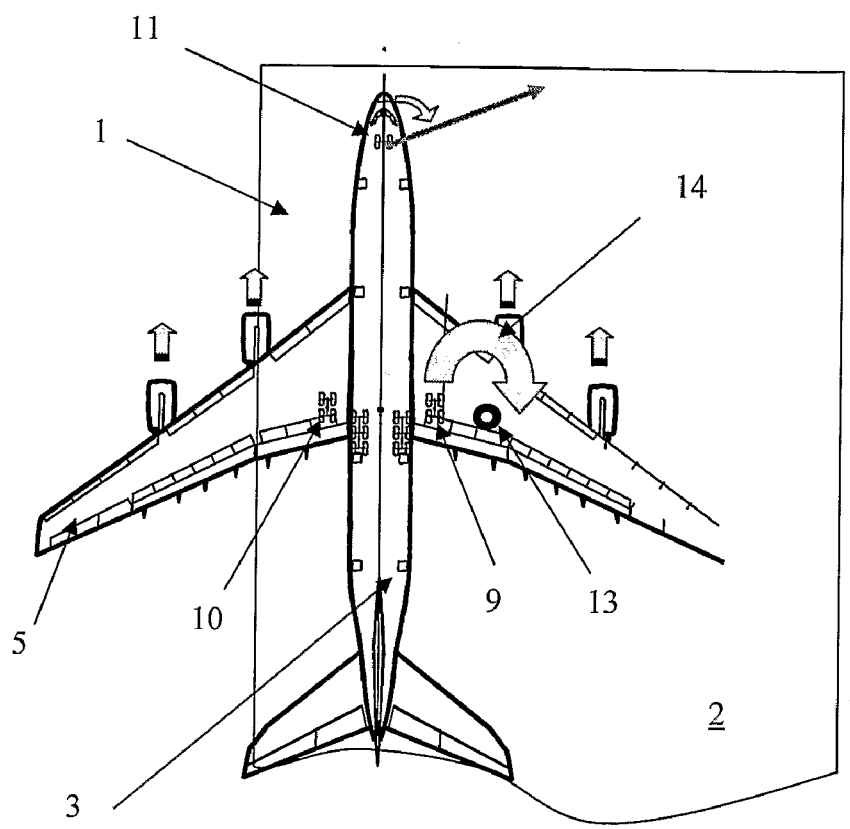
FIGS. 1a to 1d show an aircraft performing a braked pivot turn.
Figure 1B:
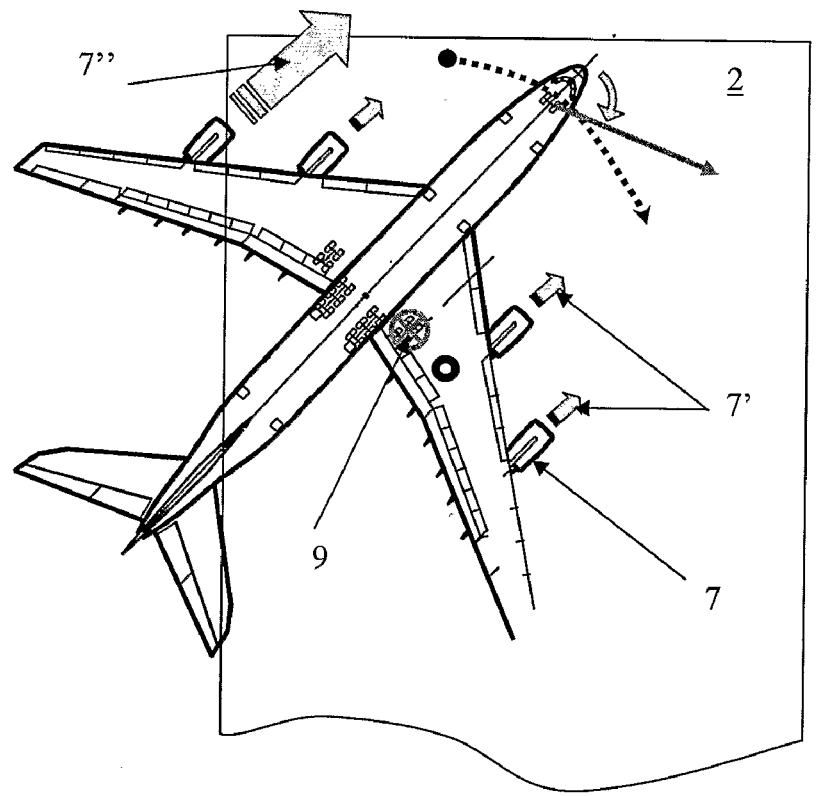
Figure 1C:
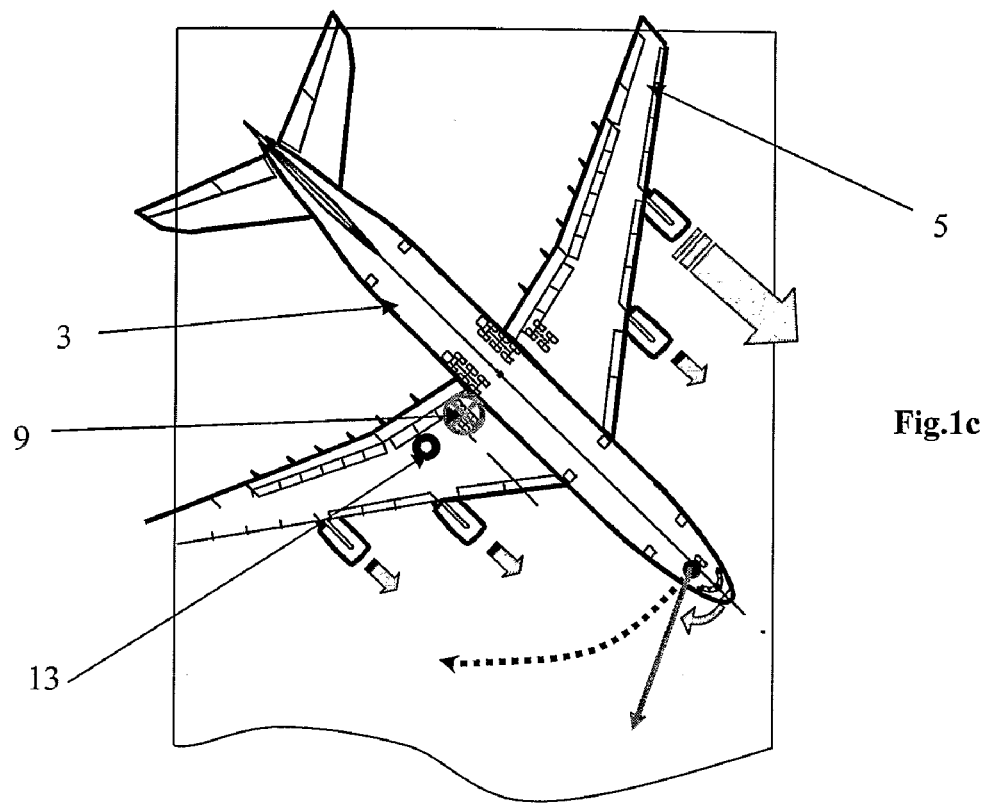
Figure 1D:
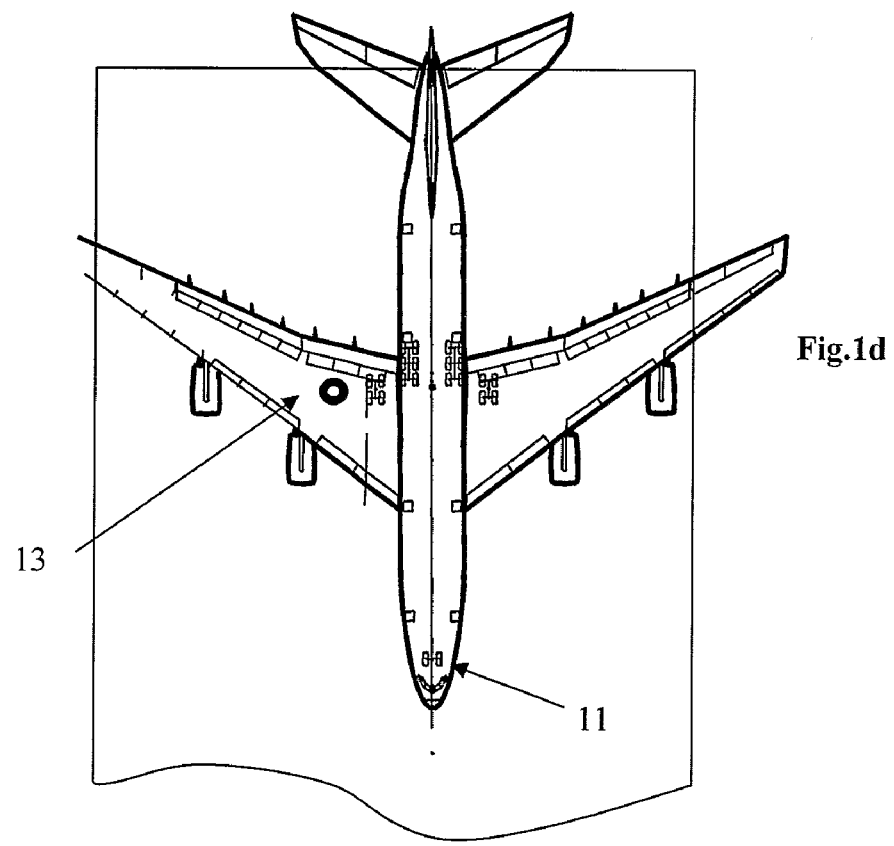

FIGS. 1a to 1d show a plan view of an aircraft 1 performing a braked pivot turn on a narrow runway 2. The aircraft comprises a fuselage 3 and wings 5, and four engines 7. Two landing gear assemblies 9, 10 are located under the wings 5 and either side of the fuselage 3. Each landing gear assembly comprises (referring to FIG. 3) a leg 15, bogie 17 connected in its centre thereto and two pairs of wheels 19, 20 mounted on the bogie. Two wheels 19a, 20a are located on a first side of the bogie and two wheels 19b, 20b are located on a second side of the bogie. The aircraft 1 also comprises a nose wheel 11 located at the front of the fuselage.

In FIG. 1, the aircraft 1 has reached the end of the narrow runway 2 and must therefore perform a tight right-hand turn. The engines are on ground idle and are producing only a small amount of forward thrust (shown by the arrows 7' in FIGS. 1a to 1d). The forward speed of the aircraft is approximately five knots.

As is known in the art, to effect a first type of braked pivot turn the pilot performs three steps. First the nose wheel 11 is turned to one side. Then the pilot applies the brakes to the wheels of one of the landing gear 9 as indicated by the crossed-circle in FIGS. 1b and 1c. Finally a thrust is generated suitable for turning the aircraft. In the first embodiment the forward thrust 7" of the left outermost engine is increased above idle. The net effect of the engine thrusts is a net thrust (not shown). The net thrust acts through a centre of thrust (not shown) spaced apart from the centre line of the fuselage, and close to the left-hand outermost engine.

The aircraft thus turns in a relatively small turning circle about a centre of turning 13 located close to the landing gear 9 on which brakes are applied. The landing gear travels, initially in a forward motion, in a tight circle 14 (the movement of the landing gear has been exaggerated for the sake of clarity). When the aircraft has turned through 180 degrees, the pilot reduces the outermost engine thrust to idle, straightens up the nose wheel and releases the brakes on the landing gear 9.

In braked pivot turns of the prior art, all the wheels on the landing gear 9 are braked during the manoeuvre. This creates a large torque in the leg of the landing gear assembly 9 due to the scrubbing of the tyres on the runway 2. According to the present embodiment of the invention however, only the wheels 19a, 20a on the side of the bogie 17 located closer to the centre of turning 13 are braked. As will now be described with reference to FIGS. 2 and 3, this reduces the torque to which the leg 15 is subjected. It is thought that the selective braking of the bogie wheels creates a secondary torque which acts in the opposite direction to the above-mentioned torque created by the scrubbing of the tyres on the runway, thereby reducing the overall torque.

FIG. 2 comprises images from a computer simulation, showing the loads in a landing gear assembly during three different braked pivot turns. The graphical displays show the torque in a landing gear leg in a time period of 30 to 80 seconds during the three different braked pivot turns.

Figure 2A:
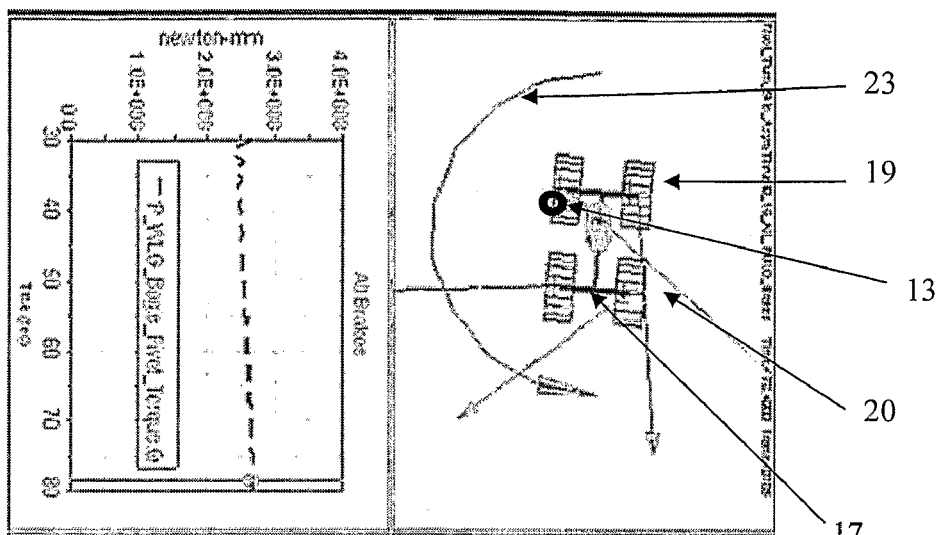
FIGS. 2a to 2c are images from a computer simulation, showing the loads in a landing gear assembly during three different braked pivot turns.
Figure 2B:
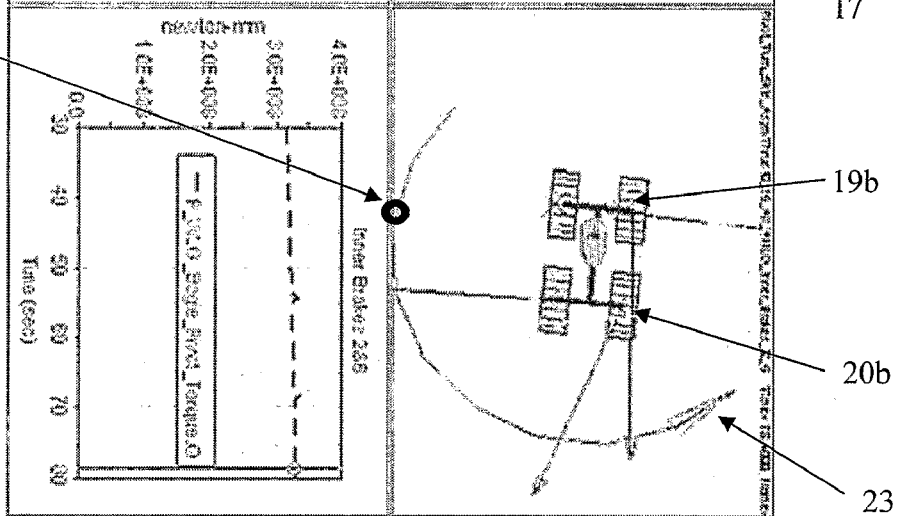
Figure 2C:
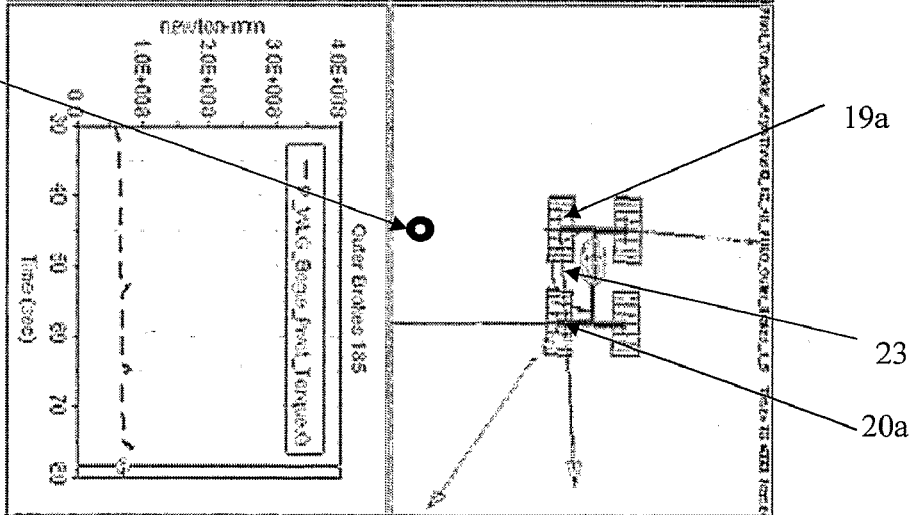

FIG. 2a shows a manoeuvre in which all four wheels on the bogie are braked, FIG. 2b shows a manoeuvre in which only the wheels on the side of the bogie further from the centre of turning are braked and FIG. 2c shows a manoeuvre in which only the wheels on the side of the bogie closer to the centre of turning are braked. The arrow 23 indicates both the direction and magnitude of forces on the wheels and landing gear leg. The longer the arrow, the greater the magnitude of the force.

Referring first to FIG. 2a, the loads shown on the landing gear assembly are those occurring during a braked pivot manoeuvre in which all four wheels 19, 20 on the bogie 17 are braked. As the aircraft 1 turns, the wheels 19, 20 are subjected to considerable frictional loading through scrubbing of the tyres on the runway. The frictional force on each wheel is acting in a different direction, but the combined effect of the scrubbing is to generate a primary torque 23 in the landing gear leg. As shown in the graphical display, the torque is approximately $2.5 \times 10^8$ Nmm throughout the time period measured.

Referring now to FIG. 2b, the loads shown on the landing gear are those occurring during a braked pivot manoeuvre in which only the wheels on the side of the bogie 17 that is further from the centre of turning 13 are braked. As the aircraft turns, the braked wheels are still subjected to considerable frictional loading due to the tyres 19b, 20b scrubbing on the runway. This frictional loading generates a primary torque (not shown) in the landing gear leg 15. The net torque 23 in the leg 15 is approximately $3.2 \times 10^8$ Nmm throughout the time period measured however. This is significantly higher than that in FIG. 2a. It is thought that the increase in torque is due to a secondary torque caused by the differential braking force on the bogie, the secondary torque acting in the same direction as the above-mentioned primary torque.

FIG. 2c shows the loads in a landing gear assembly during a braked pivot manoeuvre in which only the wheels 19a, 20a on the side of the bogie 17 that is closer to the centre of turning 13 are braked (i.e. in accordance with the method of embodiments of the present invention). As in the above-described maneuvers, as the aircraft 1 turns, the braked wheels 19a, 20a are subjected to considerable frictional loading due to the tyres scrubbing on the runway 2. This frictional loading generates a primary torque in the landing gear. The net torque 23 in the leg is approximately $0.5 \times 10^8$ Nmm throughout the time period measured however. This is significantly lower than that in FIGS. 2a (and 2b). It is thought that the decrease in torque is due to a secondary torque caused by the differential braking force on the bogie, the secondary torque acting in the opposite direction as the primary torque.

The skilled man will hence appreciate that performing the method of embodiments of the present invention generates significantly lower torque in the landing gear assembly than performing a braked pivot turns of the prior art. Large aircraft that were previously banned from making such a manoeuvre may thereby be allowed to perform braked pivot turns in accordance with embodiments of the present invention, and hence be able turn in a tight radius.

Figure 3:
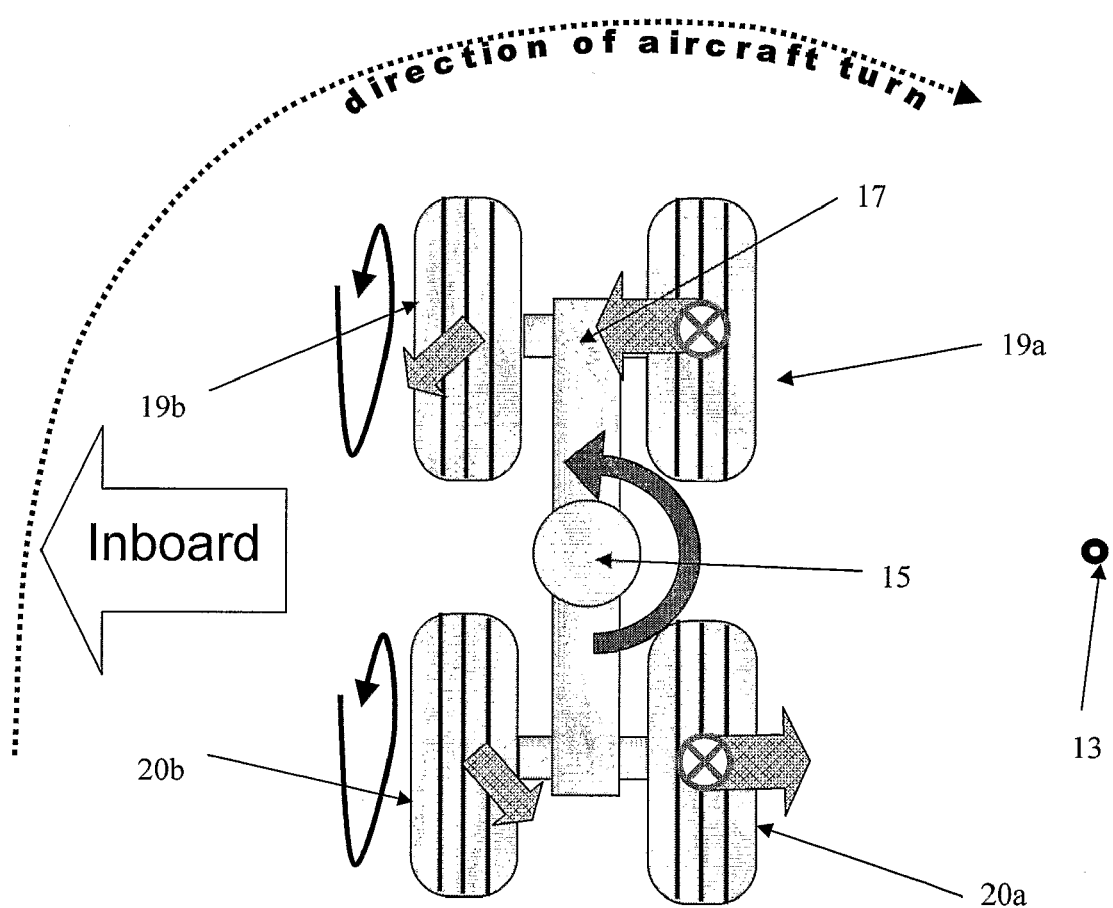
FIG. 3 is a plan view of a bogie on an aircraft performing the first type of braked pivot turn according to an embodiment of the present invention.

FIG. 3 shows a plan view of a bogie 17 on the aircraft 1 performing a braked pivot turn according to a first embodiment of the present invention. The aircraft 1 includes a brake control system (not shown) which allows each wheel 19a, 19b, 20a, 20b to be individually braked.

As shown in FIG. 2c and described above, the wheels 19a, 20a on the side of the bogie 17 closer to the centre of turning 13 are braked and the wheels on the other side of the bogie 17 are free to rotate.

According to a second embodiment of the invention (not shown) the aircraft is provided with a brake control system comprising a control unit, a ground speed receiver and a nose wheel angle receiver. The brake control system also comprises a brake input receiver which receives a signal when the pilot attempts to apply the brakes to the wheels of the landing gear.

The control unit is arranged to receive signals relating to the aircraft speed and the nose wheel angle via the ground speed receiver and a nose wheel angle receiver. The control unit is also arranged to compare the signal received from the ground speed receiver and the signal received from the nose wheel indicator, to parameter reference thresholds stored in a database within the brake control system. In the second embodiment, the aircraft speed is below the threshold value of 20 knots, and the nose wheel angle is greater than the threshold value of 60 degrees from the centre of the fuselage.

During use, the brake input receiver receives a signal due to the pilot applying the brakes. The control unit compares the signals from the receivers to the parameter reference thresholds. In this particular embodiment, the speed and nose wheel angle are outside their respective thresholds. The brake control unit therefore effects application of the brakes to only the wheels on the side of the bogie closer to the centre of turning. The torque in the landing gear leg is thereby maintained at an acceptable level such that relatively little fatigue damage occurs.

Whilst the present invention has been described and illustrated with reference to particular embodiments, it will be appreciated by those of ordinary skill in the art that the invention lends itself to many different variations not specifically illustrated herein. By way of example, certain variations to the above-described embodiments will now be described.

Each landing gear need not comprise four wheels. For example, the landing gear may comprise two wheels (in which case the term 'bogie' will be understood to mean the structure at one end of the landing gear leg that is common to both wheels, for example the axle). The landing gear may comprise 6 or more wheels. The steps performed to effect the braked pivot turn need not be made in the order described above. A Jacobs manoeuvre may be effected, rather than the braked pivot turn described in respect of the first embodiment.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. A method of braked pivot turning an aircraft on the ground, the aircraft comprising a fuselage, a landing gear assembly located to one side thereof, and a brake control system, the landing gear assembly comprising a bogie with a plurality of wheels mounted thereon, at least one wheel being located on a first side of the bogie and at least one wheel being located on a second side of the bogie, the method including the steps of:
(i) applying thrust suitable for moving the aircraft,
(ii) receiving a signal as an input to the brake control system, the signal relating to the application of brakes to the wheels of the aircraft landing gear, and
(iii) the brake control system, in dependence on the signal, applying, via the braking of at least one wheel, a greater braking force to the first side of the bogie than to the second side, the first side being located closer to the centre of turning of the aircraft than the second side.

2. A method according to claim 1 wherein the thrust is a differential thrust suitable for turning the aircraft.

3. A method according to claim 1 wherein at least one more wheel is braked on the first side of the bogie than on the second side.

4. A method according to claim 1 wherein the aircraft is travelling at less than 20 knots.

5. A method according to claim 1, the aircraft further comprising a nose wheel, wherein the method further includes the step of turning the nose wheel at an angle of greater than 45 degrees to the centre-line of the aircraft fuselage.

6. A method according to claim 1 further comprising the steps of:
(i) receiving a first signal relating to an aircraft parameter, and
(ii) applying the braking force in dependence on the signal.

7. A method according to claim 6 further comprising the steps of:

(i) comparing the value of the aircraft parameter to an aircraft parameter reference threshold, and
(ii) applying the braking force if the value of the parameter is outside the reference threshold.

8. A method according to claim 1, wherein the aircraft is heavier than 50 tonnes dry weight.

9. An aircraft for use in the method of claim 1 wherein the aircraft is so arranged that a greater braking force can be applied to the first side of the bogie of the landing gear assembly than to the second side.

10. A brake control system that is arranged to selectively brake wheels on a landing gear assembly during an aircraft braked pivot turn, the aircraft comprising a fuselage and the landing gear assembly being located to one side thereof, the landing gear assembly comprising a bogie with a plurality of wheels mounted thereon, at least one wheel being located on a first side of the bogie and at least one wheel being located on a second side of the bogie, wherein the brake control system comprises a brake input receiver for receiving a signal relating to the application of brakes to the wheels of the aircraft landing gear and the brake control system, in dependence on the signal received by the brake input receiver, is arranged to effect, via the braking of at least one wheel, a greater braking force on the first side of a bogie than on the second side, the first side being located closer to the centre of turning of the aircraft than the second side.

11. A brake control system according to claim 10, further comprising
a first receiver for receiving a signal relating to an aircraft parameter, and a database for storing an aircraft parameter reference threshold,
wherein, the brake control system is arranged to compare the value of the aircraft parameter to the aircraft parameter reference threshold, and the brake control system is arranged to effect the braking of at least one wheel in dependence on the comparison of the aircraft parameter to the aircraft parameter reference threshold.

12. An aircraft wherein the aircraft is so arranged that a greater braking force can be applied to the first side of the bogie of the landing gear assembly than to the second side, wherein the aircraft comprises a brake control system according to claim 10.

13. A method of braked pivot turning an aircraft on the ground, the aircraft comprising a fuselage, a brake control system and two landing gear assemblies, the landing gear assemblies being located either side of the fuselage and each comprising a bogie with a plurality of wheels mounted thereon, at least one wheel being located on an inner side of the bogie and at least one wheel being located on an outer side of the bogie, the method including the steps of:
(i) applying thrust suitable for moving the aircraft,
(ii) receiving a signal as an input to the brake control system, the signal relating to the application of brakes to the wheels of the aircraft landing gear assemblies, and
(iii) the brake control system, in dependence on the signal, braking at least one wheel on the landing gear assembly that is located the closer to the centre of turning of the aircraft,
wherein,
via the braking of at least one wheel, a greater braking force is applied by the brake control system to the outer side of the bogie of said landing gear assembly than to the inner side.

14. A method of braked pivot turning an aircraft on the ground, the aircraft comprising a fuselage and a landing gear assembly located to one side thereof, the landing gear assembly comprising a bogie with a plurality of wheels mounted thereon, at least one wheel being located on a first side of the bogie and at least one wheel being located on a second side of the bogie, the method including the steps of:
(i) applying thrust suitable for moving the aircraft,
(ii) via the braking of at least one wheel, applying a greater braking force to the first side of the bogie than to the second side, the first side being located closer to the centre of turning of the aircraft than the second side,
(iii) receiving a first signal relating to an aircraft parameter,
(iv) applying the braking force in dependence on the signal,
(v) comparing the value of the aircraft parameter to an aircraft parameter reference threshold, and
(vi) applying the braking force if the value of the parameter is outside the reference threshold.

15. A brake control system for selectively braking wheels on a landing gear assembly during an aircraft braked pivot turn, the aircraft comprising a fuselage and the landing gear assembly being located to one side thereof, the landing gear assembly comprising a bogie with a plurality of wheels mounted thereon, at least one wheel being located on a first side of the bogie and at least one wheel being located on a second side of the bogie, wherein the brake control system is arranged to effect, via the braking of at least one wheel, a greater braking force on the first side of a bogie than on the second side, the first side being located closer to the centre of turning of the aircraft than the second side,
a first receiver for receiving a signal relating to an aircraft parameter, and a database for storing an aircraft parameter reference threshold,
wherein, the brake control system is arranged to compare the value of the aircraft parameter to the aircraft parameter reference threshold, and the brake control system is arranged to effect the braking of at least one wheel in dependence on the comparison of the aircraft parameter to the aircraft parameter reference threshold.

* * * * *